(12) United States Patent
Spahn

(10) Patent No.: US 8,111,895 B2
(45) Date of Patent: Feb. 7, 2012

(54) LOCALLY ADAPTIVE IMAGE ENHANCEMENT FOR DIGITAL SUBTRACTION X-RAY IMAGING

(75) Inventor: Martin Spahn, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1072 days.

(21) Appl. No.: 11/684,767

(22) Filed: Mar. 12, 2007

(65) Prior Publication Data
US 2008/0137935 A1    Jun. 12, 2008

Related U.S. Application Data

(60) Provisional application No. 60/868,771, filed on Dec. 6, 2006.

(51) Int. Cl.
*G06K 9/46* (2006.01)
*G06K 9/36* (2006.01)

(52) U.S. Cl. ........ 382/132; 382/128; 382/260; 382/274; 382/283; 378/5; 378/98.11; 378/98.12

(58) Field of Classification Search .................. 382/132, 382/128, 260, 274, 283; 378/5, 98.11, 98.12
See application file for complete search history.

(56) References Cited

U.S. PATENT DOCUMENTS

| | | | |
|---|---|---|---|
| 4,105,922 A | | 8/1978 | Lambert et al. |
| 4,223,384 A | * | 9/1980 | Hounsfield et al. ............ 600/425 |
| 4,551,800 A | * | 11/1985 | Riederer et al. ............... 600/407 |
| 4,559,557 A | * | 12/1985 | Keyes et al. ................. 378/98.11 |
| 4,573,035 A | * | 2/1986 | Dolazza .......................... 341/138 |
| 4,636,953 A | * | 1/1987 | Kageyama ................. 378/98.12 |
| 5,091,925 A | | 2/1992 | Haendle et al. |
| 5,574,764 A | * | 11/1996 | Granfors et al. ............. 378/98.7 |
| 5,675,624 A | | 10/1997 | Relihan et al. |
| 5,712,895 A | | 1/1998 | Negrelli et al. |
| 5,827,187 A | | 10/1998 | Wang et al. |
| 6,424,730 B1 | | 7/2002 | Wang et al. |
| 6,633,684 B1 | | 10/2003 | James |
| 6,650,729 B2 | * | 11/2003 | Braess et al. ................... 378/108 |
| 6,768,784 B1 | | 7/2004 | Green et al. |
| 6,782,137 B1 | | 8/2004 | Avinash |
| 7,190,819 B2 | * | 3/2007 | Viswanathan ................ 382/128 |
| 7,471,768 B2 | * | 12/2008 | Curtis et al. ................... 378/115 |
| 2004/0101088 A1 | * | 5/2004 | Sabol et al. ......................... 378/4 |
| 2005/0002546 A1 | * | 1/2005 | Florent et al. ................. 382/128 |
| 2005/0163358 A1 | * | 7/2005 | Moeller .......................... 382/128 |
| 2006/0008131 A1 | * | 1/2006 | Shinbata ........................ 382/132 |
| 2006/0241369 A1 | * | 10/2006 | Lienard et al. ................ 600/407 |
| 2007/0265518 A1 | * | 11/2007 | Boese et al. ................... 600/407 |

* cited by examiner

OTHER PUBLICATIONS

Aufrichtig, et al. "X-Ray Fluoroscopy Spatio-Temporal Filtering with Object Detection." IEEE Transactions on Medical Imaging. 14.4 (1995): 733-746. Print.*

*Primary Examiner* — Michael A Newman
(74) *Attorney, Agent, or Firm* — Alexander J Burke

(57) ABSTRACT

A system and method provide local image enhancement. Internal native images of a patient may be acquired during an interventional procedure. A portion of the native images may show an interventional device or material. Subtracted images may be created by subtracting mask images from the native images, such as via either digital subtraction angiography to display vessel structures, or "roadmapping" during interventional procedures to deploy various medical devices and materials. The local level of absorption associated with the portion of the images showing a vessel structure or in which the interventional object resides may be determined from either the native images or the mask images. Subsequently, the subtracted images may be locally altered to compensate for the local level of absorption such that the visibility of a vessel structure or interventional object is enhanced. The subtracted images may be enhanced by altering the local contrast, brightness, or sharpness, or noise.

22 Claims, 4 Drawing Sheets

LOCALLY ADAPTIVE IMAGE ENHANCEMENT FOR DIGITAL SUBTRACTION X-RAY IMAGING

PRIORITY AND CROSS-REFERENCE TO RELATED APPLICATION

This application claims priority under 35 U.S.C. §119(e) to provisional application Ser. No. 60/868,771, filed on Dec. 6, 2006, which is incorporated by reference in its entirety herein.

BACKGROUND

The present embodiments relate generally to the display of images. In particular, the present embodiments relate to enhancing the quality of medical images being displayed.

Conventional diagnostic and interventional procedures may involve digital subtraction techniques. The digital subtraction techniques may be performed on images acquired at different instances in time to enhance objects of interest and remove distracting information. Typical digital subtraction techniques may involve the subtraction or linear superposition of a mask image from an actual or native image to create a subtracted image. However, conventional subtracted images may be prone to have an unacceptable level of noise due to the small amount of contrast available after subtraction.

Additionally, if an object of interest, such as an interventional device or material ("IDM"), is located above a large bone structure, for example, the spine during a body angiography procedure or facial bones during a neurological angiographic procedure, additional issues may arise. In these problematic regions, the incoming X-ray spectrum is hardened and the x-ray flux strongly reduced due to significant x-ray absorption by the bone structure. As a result, the image contrast may be reduced and the image noise increased due to the hardened x-ray spectrum. Unfortunately, medical personnel, such as an interventional radiologist, may then "lose site of" or, generally speaking, hardly be able to see, if at all, the object of interest within the problematic region of the images.

BRIEF SUMMARY

By way of introduction, the embodiments described below include methods, processes, apparatuses, instructions, or systems for local medical image enhancement. To improve the visibility of an area of a blood vessel or an interventional device or material ("IDM"), such as a wire, stent, needle, coil, camera, catheter, or glue, in medical images, the native or non-subtracted images may be analyzed locally to determine a problematic area of the image associated with high x-ray absorption and resulting low x-ray flux. The problematic area(s) of the entire image may be locally altered to compensate for the high x-ray absorption and enhance the visibility of the vessel or IDM as shown within the image. In one embodiment, the image actually locally enhanced is a subtracted image generated using a digital subtraction technique and the region of high absorption may be determined from analyzing either the native image or a mask image used to create the subtracted image. The high absorption may be compensated for by locally altering the contrast, sharpness, brightness, and/or noise level of the problematic area of the image, leaving the non-problematic areas of the image unchanged.

In a first aspect, a method provides local image enhancement. The method includes determining a localized portion associated with a subtracted x-ray image having high x-ray absorption as a function of an x-ray absorption associated with either a native or a mask image used to generate the subtracted x-ray image. The method also includes altering the localized portion to compensate for the high absorption such that visibility of an interventional object or an area of a vessel as shown in the subtracted x-ray image is enhanced.

In a second aspect, a method provides local image enhancement. The method includes acquiring a native x-ray image, generating a subtracted image by subtracting a mask image from the native x-ray image, and determining a localized area associated with high x-ray absorption, the high x-ray absorption being approximately equal to or above an average level of absorption associated with at least a portion of either the native x-ray image or the mask image. The method also includes altering data associated with the localized area to compensate for the high absorption such that visibility of an interventional object or an area of a vessel as shown in the subtracted image is enhanced.

In a third aspect, a data processing system provides local image enhancement. The system includes a processor operable to subtract a mask image from a native x-ray image to create a subtracted image, analyze either the mask image or the native x-ray image, or respective corresponding image data of either, to determine a localized region of the subtracted image associated with a lower than average x-ray flux, and alter the localized region of the subtracted image to compensate for the lower than average x-ray flux. The system also includes a display screen operable to display the altered subtracted image such that visibility of an interventional object or a portion of a vessel as shown in the localized region is enhanced.

In a fourth aspect, a computer-readable medium having instructions executable on a computer and stored thereon is described. The instructions include altering a localized area of a subtracted x-ray image or image data corresponding to a portion of either a native image or a mask image associated with a high local level of absorption or a low local level of x-ray flux to compensate for the high local level of absorption or the low local level of x-ray flux such that visibility of an interventional object or a region of a vessel as shown in the localized area is enhanced.

The present invention is defined by the claims detailed herein. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The present embodiments will become more fully understood from the detailed description given herein below and the accompanying drawings which are given by way of illustration only, and are not limitative of the present invention, and wherein.

DETAILED DESCRIPTION OF THE DRAWINGS AND EXEMPLARY PREFERRED EMBODIMENTS

Figure 1:
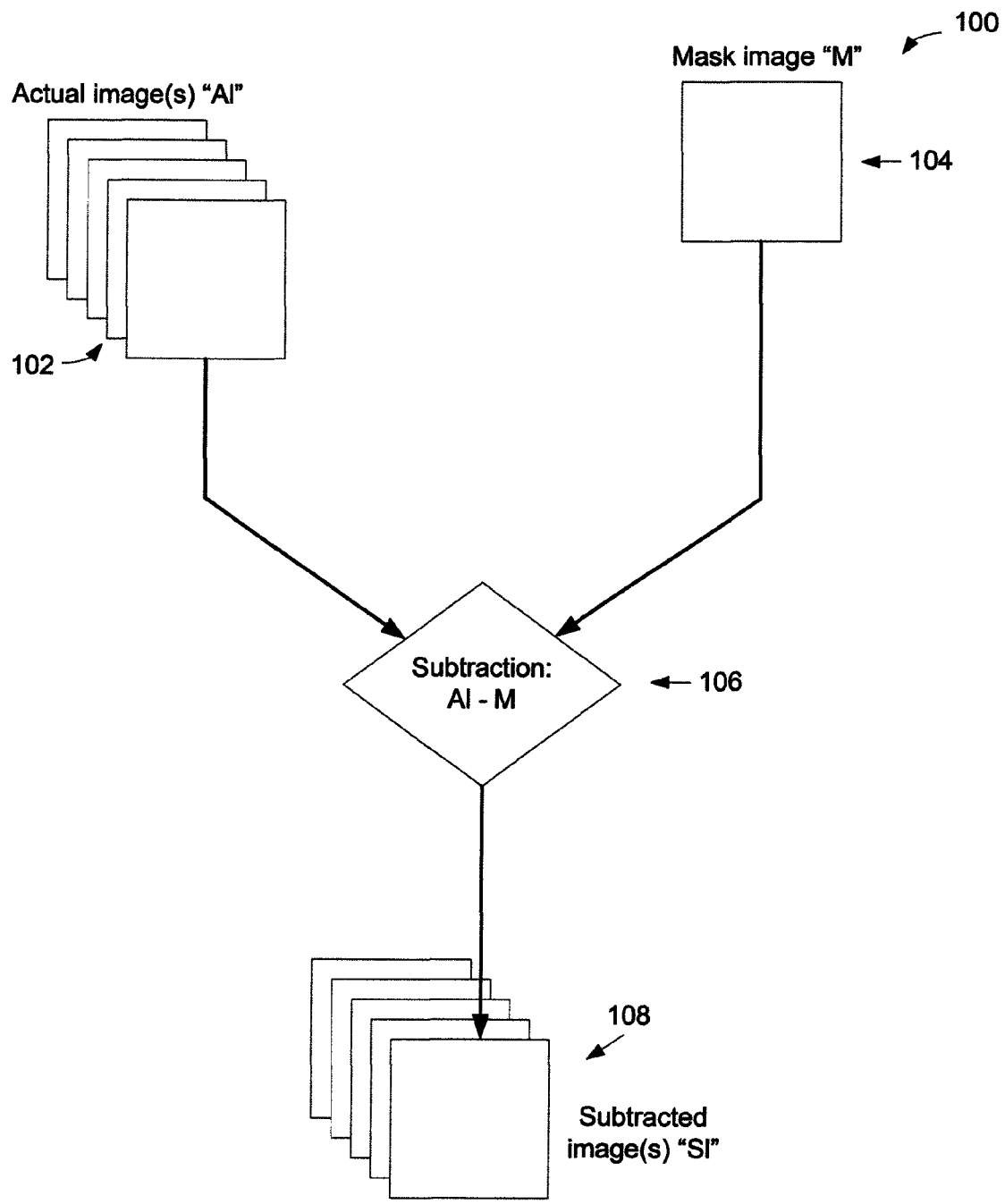
FIG. 1 is an exemplary digital subtraction technique.
Figure 2:
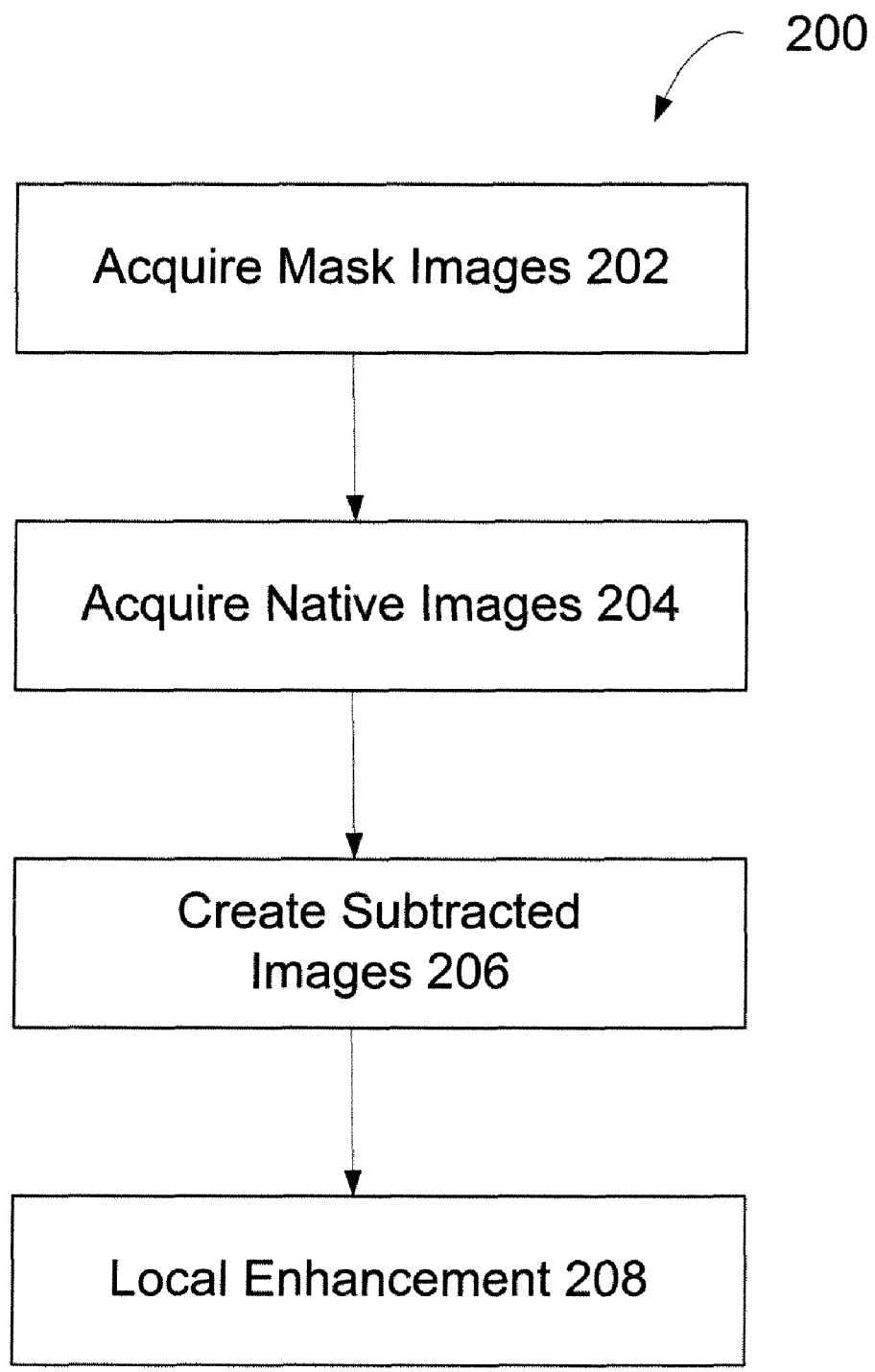
FIG. 2 is an exemplary method of enhancing localized areas of images.

The embodiments described herein include methods, processes, apparatuses, instructions, or systems for providing localized image enhancement. Internal medical images may be acquired during diagnostic and interventional procedures related to radiology, cardiology, or other medical fields. The internal images may be acquired using various medical imaging devices and techniques.

Operations may be performed on the images acquired to enhance them. For instance, digital subtraction techniques may be used to enhance images taken at different instances in time by removing unwanted information, such as bone structures. Such imaging is known as (1) digital subtraction angiography (DSA), which may be used to display vessel structures for diagnostic purposes, or (2) "roadmapping," which may be used during interventional procedures, such as deploying a coil into an aneurism, a stent to treat a stenosis (angioplasty), or a glue material to drain vessel shunts.

More specifically, digital subtraction angiography may be used to display only the blood vessels of a patient after the bodily structures, such as bones and/or organs, have been removed from the images to determine the condition of a vessel, such as if the vessel is open or closed, or associated with a stenoses or aneurism. An initial or mask image set may be acquired first. After a contrast medium has been injected into the patient, a second image set may be acquired. As such, the second image set may capture the contrast medium traveling throughout a vessel tree and detail a gradual increase and subsequent decrease of contrast medium flowing within different portions of the images. The mask image set, taken without any contrast medium being administered, may be subtracted from the second image set to generate a subtracted image set showing only the blood vessels (the bone and/or organ structure being removed via the subtraction).

With roadmapping, the objective may be to deploy a wire, coil, stent, catheter, camera, glue, or other interventional object within a certain blood vessel. For instance, a medical device deployed may be operable to open up a constricted blood vessel. During an initial phase (Phase I) of roadmapping, an initial or mask image set may be created from a set of images acquired while contrast medium flows through the vessel branches. Maximum opaque techniques that look for the darkest pixel in each of these images and use that pixel value for the mask image may be employed to generate the mask image. Alternatively or additionally, averaging techniques may be used to generate the mask.

During a second phase (Phase II) of roadmapping, an interventional object may be introduced into the patient. Phase II may involve moving the interventional object within a blood vessel or an artery. A second image set may be acquired showing the interventional object internal to the patient without a contrast medium having been administered. Subtracting the Phase I images from the Phase II images may yield images of the interventional object within the blood vessel or artery without unwanted bone and/or organ structures being displayed. Other subtraction imaging embodiments may be used.

However, imaging involving the subtraction of mask images from native images remains a technical challenge. With conventional techniques, certain areas of vessels or interventional devices or materials ("IDMs"), such as wires, stents, cameras, needles, coils, catheters, glues, or other medical devices and compositions may be difficult, if not impossible, to see within the original images acquired. Not being able to properly visualize vessels or IDMs may be cumbersome, creating inconveniences and inefficiencies for medical personnel performing interventional or diagnostic procedures.

As an example, conventional DSA and roadmapping procedures may generate inadequate subtracted images if the patient moves or is not positioned the same in both image sets. With roadmapping, the difficulties may be further exasperated during neurological procedures. The human head contains very small blood vessels. The medical devices introduced into those small vessels may be micro-medical devices, including micro-wires or micro-catheters. However, the very thin vessels and micro-devices may both be extremely difficult to properly image. Regions of images associated with the skull or facial bones also may have an associated high degree of x-ray absorption.

In general, the degree to which any medical device or area of a vessel can be seen in internal medical images may be in large part dependent upon the level of bone structure in the corresponding area. With typical x-ray images, the more bone structure that exists in the imaged body area, the more x-ray absorption there may be within that area and the darker (or grayer) the x-ray images will appear. A medical device or portion of a vessel may be difficult, if not impossible, to see within darkened x-ray images. On the other hand, the less bone structure that exists in the imaged body area, the less x-ray absorption there may be within that area and the lighter (or less gray) the x-ray images may appear.

In other words, the less absorption there is of the x-rays emitted by an x-ray source of an imaging device, the more x-rays (or a so-called "high" signal or flux/spectrum) may be detected by the x-ray detector for a given x-ray dosage administered via the x-ray source. And the more absorption of the x-rays emitted by the x-ray source, the less x-rays (or a so-called "low" signal or flux/spectrum) may be detected by the x-ray detector for a given x-ray dosage administered to acquire an image set.

Therefore, to overcome the local loss of visibility of the IDM (such as during a roadmap procedure) or an area of a contrast medium filled vessel (such as during a DSA procedure), the native, mask, or non-subtracted images, and/or corresponding x-ray data, may be analyzed locally to determine unacceptable local levels of x-ray absorption within the images. As explained above, the local signal or local amount of x-ray radiation received by an x-ray detector may be a direct measure of the degree of absorption. A local low signal may translate to local high absorption by the patient as only a small amount of x-ray flux was received by a localized region of the detector. Conversely, a local high signal may translate to local low absorption by the patient as a higher amount of x-ray flux was received by a localized region of the detector.

Accordingly, localized levels of absorption may be determined within x-ray images by analyzing either the local darkness/lightness (grayness) of the images or the local x-ray flux or spectrum received by the x-ray detector during imaging. The local absorption information determined may be used to enhance problematic areas associated with local high absorption shown within entire x-ray images, such as by increasing the local contrast, brightness, or sharpness, and/or reducing the local amount of noise. Simultaneously increasing the local level of contrast, brightness, and sharpness, and reducing the local noise, may provide the best results. On the other hand, the non-problematic areas not associated with high x-ray absorption may be left unaltered, which may permit limited computer or processing resources to be allocated to other purposes.

The local image information, including local x-ray absorption and/or associated local x-ray flux/spectrum data, may be used to locally alter native, mask, and/or subtracted images. In one aspect, the local image information may be acquired from either native images or mask images, since the native and mask images may be similar to a large degree (except for situations involving images having differences generated due to patient movement or the IDMs themselves).

In one embodiment, the native and mask images may be acquired via x-ray, computed tomography (CT), magnetic resonance, ultrasound, positron emission tomography (PET), and/or other types of medical imaging systems and devices. Other types of images may be acquired and locally enhanced.

I. Standard Subtraction Technique

A standard subtraction technique for digital subtraction angiography (DSA) or roadmapping is illustrated in FIG. 1. The standard subtraction technique may include acquiring actual image(s) 102, acquiring mask image(s) 104, subtracting the mask image(s) from the actual image(s) to create subtracted image(s) 106, and displaying the subtracted images 108. However, the method shown in FIG. 1 does not provide for local image enhancement, which may result in IDMs or areas of vessels not being adequately visible in the images displayed and create various operational encumbrances for medical personnel.

II. Exemplary Local Enhancement Techniques

A method is provided herein for locally enhancing images to improve the visibility of IDMs shown in localized portions of medical images. FIG. 1 illustrates a method of local image enhancement 200. The method 200 may include acquiring mask image(s) 202, acquiring native image(s) 204, creating subtracted image(s) 206, and locally enhancing the image(s) 208. The method of locally enhancing images may include additional, fewer, or alternate actions.

The method may include acquiring mask image(s) or a mask image data set 202. The mask images may be acquired during or for use with DSA, roadmapping, or other medical procedures. For instance, the mask images may be acquired via various medical imaging devices, either with or without a contrast medium being administered to the patient. The mask images and/or associated mask image data may be stored in a storage medium for access by a data processing unit or a system controller.

The method may include acquiring native image(s) or a native image data set 204. The native images may be acquired during or for use with DSA, roadmapping, or other medical procedures. For instance, the native images may be acquired via various medical imaging devices, either with or without a contrast medium being administered to the patient. The native images and/or associated native image data may be stored in a storage medium for access by a data processing unit or a system controller.

The method may include creating subtracted image(s) or a subtracted image data set 206. For instance, the mask image(s) or data set may be subtracted from the native image(s) or data set to generate the subtracted image(s) or data set. Various digital subtraction techniques may be employed to create the subtracted images, such as the techniques disclosed by U.S. Pat. Nos. 5,712,895, 4,559,557, and 5,827,187, which are all incorporated by reference herein in their entireties. Other subtraction techniques may be employed.

The method may include locally enhancing the images or image data sets 208 using local image information. The local image information may be related to the local x-ray absorption and/or the local x-ray flux associated with a local region within an image. The images or image data sets may be locally altered to compensate for the local level(s) of high x-ray absorption and/or low x-ray flux associated with the images or image data sets. By altering a localized region of an image associated with high absorption or low flux, the visibility of an IDM or an area of vessel shown within the locally altered localized region of the image may be enhanced. The IDM or area of a vessel may become partly, further, or even fully visible within a displayed image. In one embodiment, problematic localized areas of the subtracted images are locally enhanced. Alternatively, localized areas of the native and/or mask images may be enhanced.

The localized portions of images to be altered may be determined by analyzing local image or image data set information. In one aspect, the local image information is acquired from either the native images/image data set or the mask images/image data set. The local image information of the native or mask images may be used to locally alter corresponding regions in the subtracted images. Alternatively, the local image information may be acquired from the subtracted images/image data set.

As noted above, the local image information may be related to the local level of x-ray absorption associated with a region of an image. For instance, an average level of absorption associated with an entire or a portion of an image may be determined. Localized areas of the image having a higher than average absorption may be selected to be altered to compensate for the high absorption. Alternatively, unacceptable local levels of absorption may be determined as being unacceptably high ratios of local absorption to an average absorption associated with either the entire image or a portion thereof. For example, a local level of absorption associated with a ratio of local absorption to average absorption of 2:1, 3:1, 4:1 or other ratio may be used to determine or flag local image areas to be altered.

The local image information may be determined by analyzing brightness and/or darkness levels (or the amount of "gray") of the image. The "grayness" of x-ray images may provide an indication of the corresponding level of x-ray absorption. An average level of brightness and/or darkness (or grayness) associated with an image may be determined. Localized areas having lower than average brightness or higher than average darkness (higher than average grayness) may be associated with a higher than acceptable level of absorption. Alternatively, unacceptable local levels of high absorption may be determined as being unacceptable ratios of the local level of gray to an average level of grayness of the entire image or a portion thereof, such as 2:1, 3:1, 4:1, or other ratio.

In one embodiment, the average level of gray associated with an image may be determined using various reference signals, such as peak brightness and/or darkness reference signals. Gain and feedback signals may be employed to adjust the level of gray associated with one or more pixels to an acceptable level, such as an approximately average level of gray. An exemplary "average brightness detector" is disclosed by U.S. Pat. No. 5,675,624, which is incorporated herein by reference in its entirety. Other types of average detectors, including average contrast and sharpness detectors, may be used.

The local image data may alternatively be determined by analyzing the image or image data set to determine the local levels of x-ray flux/spectrum received by the x-ray detector. The local x-ray flux or spectrum received by the x-ray detector may provide an indication of the corresponding local level of x-ray absorption. An average level of x-ray flux or spectrum associated with an image or a portion thereof may be determined. Localized areas having lower than average x-ray flux may be associated with having a higher than acceptable local level of absorption. Alternatively, unacceptable local levels of high absorption may be determined as being unacceptable ratios of local flux to the average x-ray flux of the entire image or a portion thereof. The average level of x-ray flux or spectrum may be determined by analyzing the images or image data and/or the energy spectrum data of the x-ray signals received directly by the x-ray detector.

In one embodiment, the x-ray image may be displayed as having multiple visually discernible shades of gray or gray scale levels. A processor may be operable to analyze x-ray attenuation data associated with the images to determine local regions to be altered. The x-ray attenuation associated with a region of an image may be determined as a function of one or more x-ray absorption coefficients, including coefficients for body tissue and/or bone structures. A number of gray scale gradations into which a full absorption range is divided may be used, similar to the technique disclosed by U.S. Pat. No. 4,105,999, which is incorporated herein by reference in its entirety. A localized region of an image may be determined to have a local level of high absorption or low flux based upon where that localized region's gray scale number falls within the full absorption range. For example, a region with an approximately average or above average gray scale number may be selected for local image enhancement.

Once the localized portion of the image to be altered is determined, the local contrast, brightness, and/or sharpness of the localized portion may be changed. Alternatively or additionally, the local noise of the localized portion may be reduced. As a result, the visibility of an IDM or an area of interest of a vessel as shown within the localized portion on a display may be enhanced. In one embodiment, only the localized portion associated with high absorption is locally adapted to compensate for high absorption and/or low x-ray flux. In this manner, limited computing or processing resources may be utilized more efficiently and not expended altering the entire image or portions associated with acceptable levels of absorption and/or flux. To conserve additional computing resources, a localized region to analyze may be selected by a user via a mouse click, a touch of a touch screen, or other input device.

In one aspect, image data from an x-ray detector may be mapped, such as pixel by pixel, to a display or a memory unit. The pixels mapped may be individually altered to provide local image enhancement. A processor may alter only the pixels associated with a localized problematic region of an image. The processor may employ a look-up table of display adjustment parameters. The display adjustment parameters may be selected to be retrieved from a memory unit based upon the local level of grayness, absorption, and/or flux determined from the local image pixel data. The processor may use a display adjustment parameter retrieved from the look-up table to automatically locally alter local image pixels to compensate for local levels of grayness, absorption, and/or flux determined to be unacceptable by the processor.

The processor may employ one or more histograms to alter the images or pixel image data. The histograms may be associated with the x-ray dosage administered, resulting local image data acquired, and/or other measurements. Exemplary methods of altering image or pixel data are illustrated by U.S. Pat. Nos. 6,768,784, 6,782,137, and 6,633,684, which are incorporated herein by reference in their entireties. Other image and pixel adjustment techniques may be used.

In one embodiment, an edge enhancement technique may be used to locally alter localized regions associated with high absorption or low flux. The edge enhancement algorithm may be used to increase local levels of contrast, brightness, and/or sharpness. The edge enhancement algorithm may employ a local enhancement or correction factor based upon the surrounding or nearby pixels. For instance, a local contrast, brightness, or sharpness factor may be assigned to each pixel of an image or a portion thereof based upon identified edges. The pixels of a smaller localized region (i.e., the localized region being smaller than the entire image or portion thereof analyzed) of the image having unacceptable local levels of contrast, brightness, or sharpness may be identified by a processor. The local contrast, brightness, and/or sharpness parameters of each of the unacceptable pixels may be multiplied by an appropriate correction factor to enhance the local contrast, brightness, and/or sharpness. An exemplary edge enhancement algorithm is disclosed by U.S. Pat. No. 6,424,730, which is incorporated herein by reference in its entirety. Other edge enhancement algorithms may be used.

A high local level of noise associated with the images may be determined. The local level of noise associated with the images may be corrected in a number of manners. In one embodiment, the local level of noise may be reduced using a low-pass filter, such as the low-pass filter disclosed by U.S. Pat. No. 5,091,925, which is incorporated herein by reference in its entirety. Spatial frequency filters, variable gain amplifiers, time compensation, frequency compensation, lead or lag compensation, high-pass filters, band-pass filters, moving averages, moving average filters, and/or other filtering may be used to reduce the local level of image noise.

Figure 3:
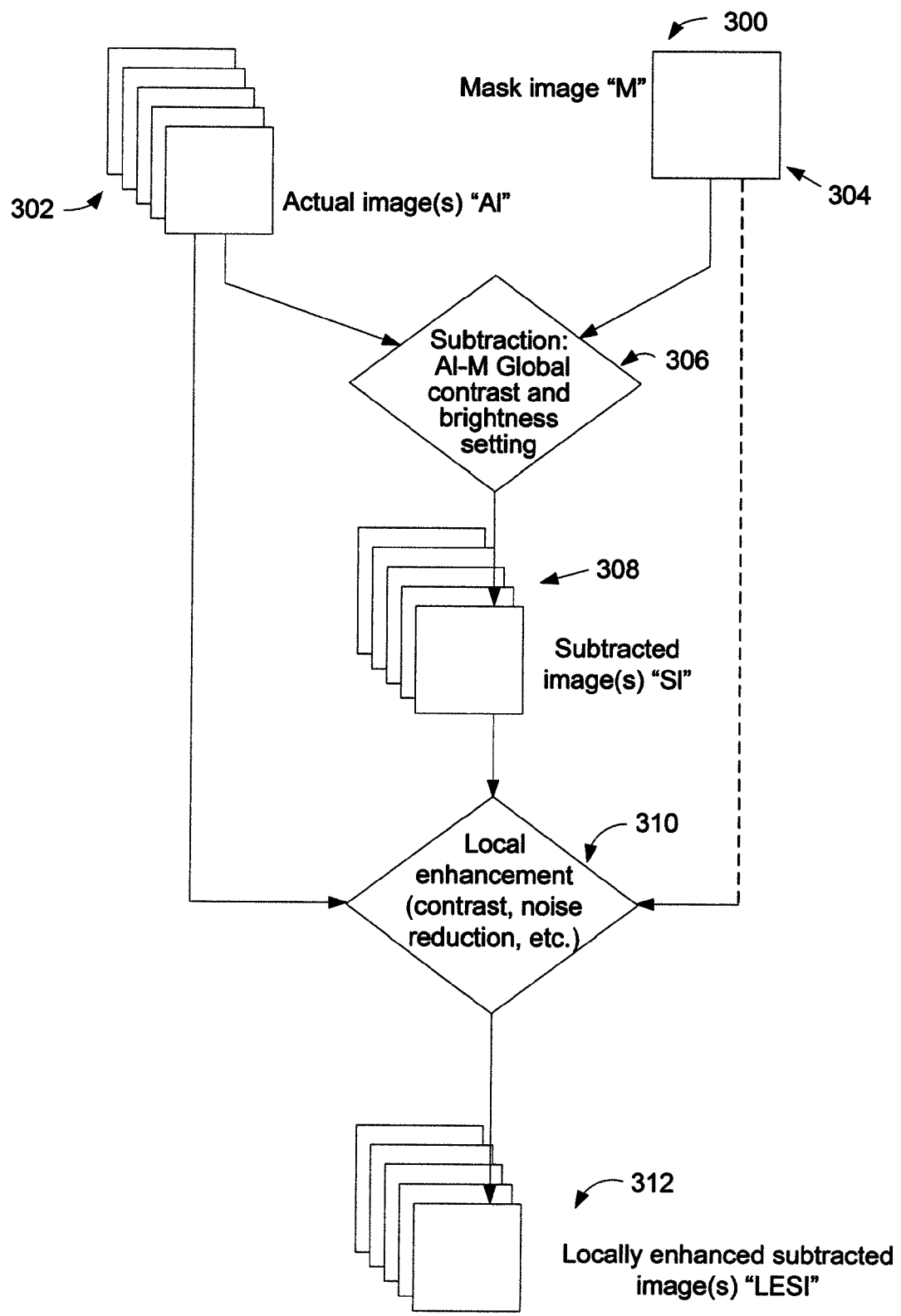
FIG. 3 is another exemplary method of enhancing localized areas of images.

FIG. 3 illustrates another exemplary method of localized image enhancement. The method may include acquiring native image(s) 302, acquiring mask image(s) 304, performing a digital subtraction technique 306, displaying the subtracted images created 308, locally enhancing the subtracted images 310, and displaying the locally enhanced subtracted images 312. The method may include additional, fewer, or alternate actions.

The native and mask images 302, 304 may be acquired using the imaging devices and systems discussed herein. The native and mask images may each have a corresponding image data set consisting of numerous pixels that is stored in a memory unit. After the native and mask images are acquired, a digital subtraction technique may be used to generate subtracted images 306. As shown in FIG. 3, the subtracted images created may be associated with only global contrast and brightness settings. The global settings may apply to the entire subtracted images displayed and be unable to locally adapt localized regions of the images.

However, as depicted by FIG. 3, either the native or the mask images may be used to provide local enhancement 310. The native and/or mask images or image data sets may be analyzed as discussed herein to determine local image information and localized image areas having high absorption and/or low flux. The localized areas of the subtracted images may be altered using the local image information determined by analyzing the native or mask images. As shown, the localized areas may have their local contrast, sharpness, and/or brightness altered, and/or their localized noise level reduced. As a result, the localized area(s) of the subtracted images may be locally enhanced and be displayed 312 such that the visibility of the IDM or an area of a vessel as shown in the localized area(s) is enhanced.

III. Exemplary Data Processor

Figure 4:
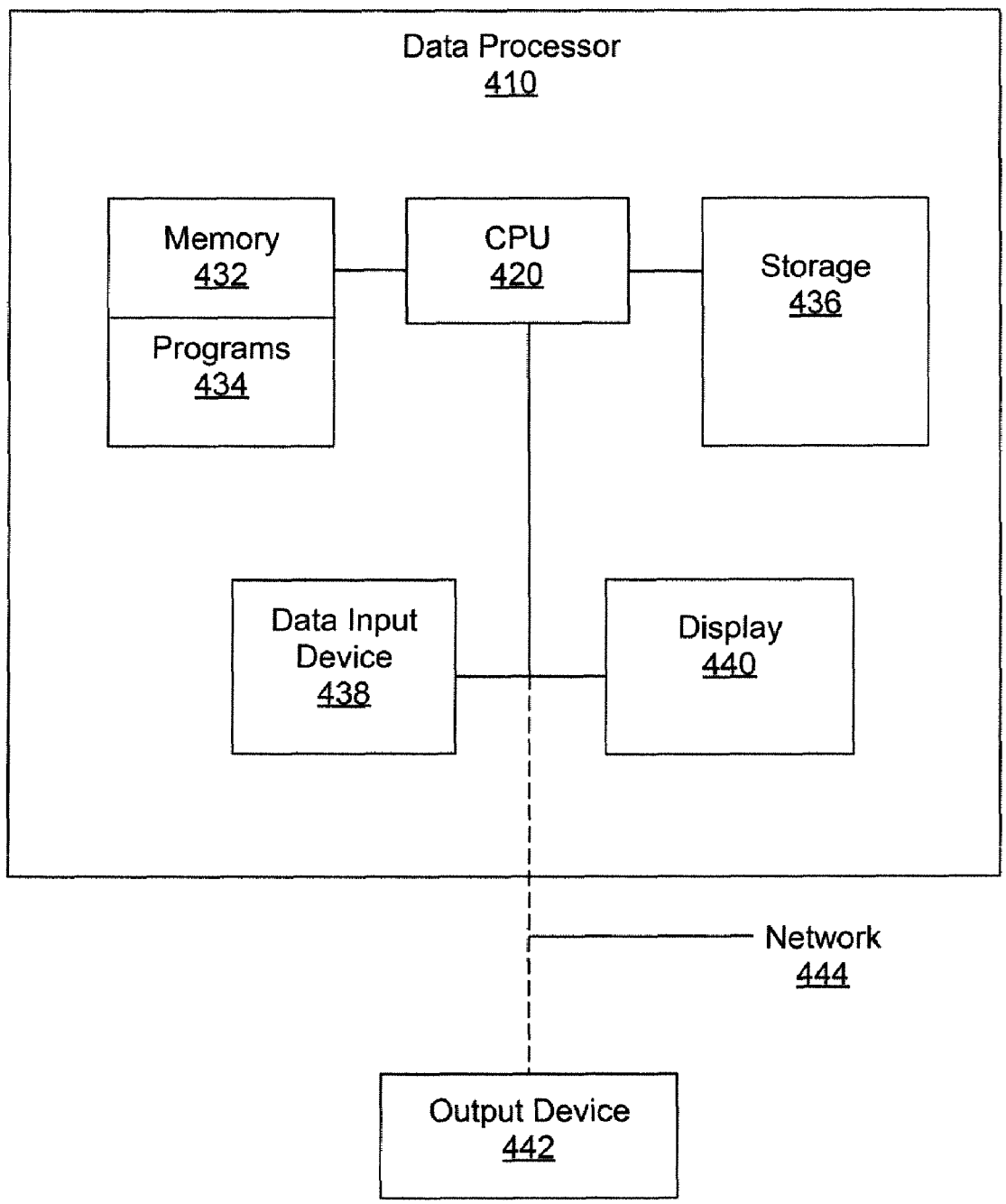
FIG. 4 is an exemplary data processing system that provides localized image enhancement.

The method for local image enhancement may be facilitated by a data processing system. FIG. 4 is a block diagram of an exemplary data processor 410 configured or adapted to provide functionality for local image enhancement. The data processor 410 may include a central processing unit (CPU) 420, a memory 432, a storage device 436, a data input device 438, and a display 440. The data processor 410 also may have an external output device 442, which may be a display, a monitor, a printer or a communications port. The data processor 410 may be a personal computer, work station, server, medical imaging system, medical scanning system, or other system. The data processor 410 may be interconnected to a network 444, such as an intranet, the Internet, or an intranet connected to the Internet. The data processor 410 may be interconnected to another location via the network 444 either by data lines or by wireless communication. The data processor 410 is provided for descriptive purposes and is not intended to limit the scope of the present system. The data processor may have additional, fewer, or alternate components.

A program 434 may reside on the memory 432 and include one or more sequences of executable code or coded instructions that are executed by the CPU 420. The program 434 may be loaded into the memory 432 from the storage device 436 or network or removable media. The CPU 420 may execute one or more sequences of instructions of the program 434 to process data. The program 434 may provide functionality as discussed herein.

Mask, native, and/or subtracted image data may be entered via the data input device 438 or another input device, or received via the network 444 or other network. The data processor 410 may receive and store the image data received in the memory 432, the storage device 436, or other storage unit. The program 434 may direct that the data received be stored on or read from machine-readable medium, including secondary storage devices such as hard disks, floppy disks, CD-ROMS, and DVDs; electromagnetic signals; or other forms of machine readable medium, either currently known or later developed.

The program 434 may instruct the data processor 410 to acquire mask image data and native image data. After which, the program 434 may instruct the data processor to create subtracted image data by performing a digital subtraction technique. For example, the program 434 may instruct the data processor to create the subtracted image data by subtracting the mask image data from the native image data, or vice versa.

The program 434 may direct the data processor 410 to analyze either the actual image or the mask image to determine a local level of x-ray absorption associated with an IDM that resides within a region of the actual image or an area of interest of a vessel, such as a contrast medium filled vessel. For instance, the program 434 may direct the data processor 410 to determine/calculate an average level of x-ray absorption or x-ray flux associated with an entire native image, an entire mask image, or an entire subtracted image. The program 434 may direct the data processor 410 to determine localized portions within the images having absorptions level above, equal to, or below the average absorption level. Alternatively, the program 434 may direct the data processor 410 to assign various values associated with the localized level of absorption to each pixel of an image of a region of interest, such as a gray scale number as discussed herein.

The program 434 may direct the data processor 410 to determine localized portions within the images having x-ray flux/spectrums above, equal to, or below the average x-ray flux/spectrum or entire images or portions thereof. Alternatively, the program 434 may direct the data processor 410 to assign various values associated with the localized level of x-ray flux/spectrum to each pixel of an image of a region of interest. The local value assigned to each image pixel may be used as flag that that individual image pixel needs to be compensated for an unacceptable local level of contrast, brightness, sharpness, and/or noise. Individual pixel enhancement within a region of interest associated with an IDM or a portion of a vessel may provide superior image enhancement.

The localized portions of native, mask, or subtracted images having unacceptable local levels of absorption and/or flux may be flagged as needing correction. As a result, the program 434 may direct the processor 410 to alter the contrast, brightness, or sharpness, or reduce the noise of the localized portions. In one aspect, the localized portions of the subtracted images are altered to compensate for high absorption in either the corresponding native or mask images.

The program 434 may instruct the data processor 410 to render the medical related images in one or more windows on the display 440, the external output device 442, or other display screen. The data processor 410 may retrieve the images from machine-readable medium, including secondary storage devices such as hard disks, floppy disks, CD-ROMS, and DVDs; electromagnetic signals; or other forms of machine readable medium, either currently known or later developed.

The program 434 may direct the data processor 410 to perform one or more navigation functions on the image data to scroll or leaf through images, or otherwise view the images in or out of sequence. The data processor 410 may divide the display 440, output device 442, or other display screen into multiple virtual sub-regions. Each of the virtual sub-regions may be associated with a specific navigation function, such as rotating, translating, panning, or zooming the images displayed. Other navigation functions may be provided.

The data processor 410 may display images and/or associated icons on the display 440, output device 442, or other display screen. A user interface may accept one or more operations performed on the images and/or associated icons to navigate through the images. The user interface may permit the user to select a region of an image to analyze. For instance, medical personnel may know that an IDM resides within a certain region of an image, yet the IDM remains barely or not visible. Alternatively, the certain region of an image may contain a vessel area of interest to be diagnosed. The medical personnel may select that localized region for image enhancement. The user interface also may provide for the rotation of images and/or the translation along an axis of the images by clicking upon an image and/or associated icon and moving, i.e., "dragging," the image and/or associated icon within the window with an input device, such as a mouse. Other operations may be performed.

The data processor 410 may superimpose one or more icons over the images displayed on the display 440, output device 442, or other display screen. A user interface may accept one or more operations performed on an icon. The operation performed on the icon may move the icon with respect to the image and/or another icon. For instance, the orientation and/or size of the icon may be adjusted. Other operations may be performed. As a result, corresponding image(s) displayed in one or more other windows may be adjusted accordingly, as discussed herein.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments and have a wide variety of applications.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

The invention claimed is:

1. A method of local image enhancement, the method comprising:
acquiring a native x-ray image;
generating a subtracted image by subtracting a mask image from the native x-ray image;
determining a localized portion less than the whole of the generated subtracted x-ray image that is non-object specific and has a high x-ray absorption as a function of an x-ray absorption associated with either the native or the mask image used to generate the subtracted x-ray image, said high x-ray absorption being due at least in part to bone structure; and
altering one or more characteristics including at least one of, (a) contrast, (b) brightness and (c) sharpness of image pixel data comprising the localized portion of the subtracted x-ray image to compensate for the high absorption such that visibility of an interventional object or an area of a vessel as shown in the subtracted x-ray image is enhanced and exclusively of altering a characteristic of a remainder portion of the subtracted x-ray image.

2. The method of claim 1, wherein the high absorption is compensated for by altering a contrast of individual pixels of the localized portion in response to a factor assigned to the pixels.

3. The method of claim 1, wherein the high absorption is compensated for by altering a brightness or sharpness of individual pixels of the localized portion in response to a factor assigned to the pixels.

4. The method of claim 1, wherein the high absorption is compensated for by reducing noise associated with the localized portion.

5. The method of claim 1, wherein the interventional object is a stent or a wire.

6. The method of claim 1, wherein the interventional object is a medical material.

7. A method of local image enhancement, the method comprising:
acquiring a native x-ray image;
generating a subtracted image by subtracting a mask image from the native x-ray image;
determining a localized area less than the whole of the subtracted image and associated with high x-ray absorption of the generated subtracted x-ray image that is non-object specific and said high x-ray absorption being due at least in part to bone structure, the high x-ray absorption being approximately equal to or above an average level of absorption associated with at least a portion of either the native x-ray image or the mask image; and
altering data associated with the localized area including at least one of, (a) contrast, (b) brightness and (c) sharpness of image pixel data comprising the localized area less than the whole of the generated subtracted x-ray image to compensate for the high absorption such that visibility of an interventional object or an area of a vessel as shown in the subtracted image is enhanced and exclusively of altering data associated with a remainder portion of the subtracted x-ray image.

8. The method of claim 7, the method comprising determining that the localized area is associated with high x-ray absorption by analyzing the x-ray flux or spectrum of either the native x-ray image or the mask image.

9. The method of claim 8, wherein the mask image represents bone structure such the subtracted image represents the native x-ray image minus the bone structure.

10. The method of claim 7, wherein the interventional object is a medical instrument or a medical material.

11. The method of claim 7, wherein the subtraction is accomplished via a digital subtraction angiography technique.

12. The method of claim 7, wherein the subtracted image is locally altered by altering a contrast or a brightness of individual pixels of the localized area in response to pixel specific factors assigned to the pixels.

13. The method of claim 7, wherein the subtracted image is locally altered by reducing noise associated with the localized area.

14. The method of claim 7, wherein the subtracted image is locally altered by enhancing a sharpness associated with the interventional object.

15. A data processing system for local image enhancement, the system comprising:
a processor operable to,
acquire a native x-ray image;
subtract a mask image from the acquired native x-ray image to create a subtracted image,
analyze either the mask image or the native x-ray image, or respective corresponding image data of either, to determine a localized region of the subtracted image associated with a lower than average x-ray flux, said localized region being non-object specific and said lower than average x-ray flux being due at least in part to bone structure, and alter one or more characteristics including at least one of, (a) contrast, (b) brightness and (c) sharpness of image pixel data comprising the localized region less than the whole of the subtracted image to compensate for the lower than average x-ray flux; and
a display screen operable to display the altered subtracted image such that visibility of an interventional object or a portion of a vessel as shown in the localized region is enhanced and exclusively of altering a characteristic of a remainder portion of the subtracted x-ray image.

16. The data processing system of claim 15, wherein the interventional object is a medical device.

17. The data processing system of claim 15, wherein the interventional object is a medical material.

18. The data processing system of claim 15, wherein the processor locally alters the localized region of the subtracted image by reducing a level of noise associated with the localized region.

19. The data processing system of claim 15, wherein the processor locally alters the localized region of the subtracted image by increasing a local level of contrast associated with individual pixels of the localized region.

20. A non-transitory computer-readable storage medium having instructions executable on a computer stored thereon, the instructions comprising:
acquiring a native x-ray image;
generating a subtracted image by subtracting a mask image from the native x-ray image;
determining a localized area less than the whole of the generated subtracted x-ray image and associated with high x-ray absorption or a low local level of x-ray flux of the generated subtracted x-ray image that is non-object specific and said high x-ray absorption being due at least in part to bone structure; and altering one or more characteristics including at least one of, (a) contrast, (b) brightness and (c) sharpness of image pixel data comprising the determined localized area of the subtracted x-ray image or image data corresponding to a portion of either the native image or the mask image associated with a high local level of absorption or a low local level of x-ray flux to compensate for the high local level of absorption or the low local level of x-ray flux such that visibility of an interventional object or a region of an image as shown in the localized area is enhanced and exclusively of altering a characteristic of a remainder portion of the subtracted x-ray image.

21. The computer-readable medium of claim 20, wherein the entire x-ray image is a subtracted image created via digital subtraction technique.

22. The computer-readable medium of claim 21, the instructions comprising determining the local level of absorption by analyzing the x-ray spectrum of either a native image or a mask image used to create the subtracted image.

* * * * *